G. E. ELIA.
APPARATUS FOR DETECTING AND INDICATING THE PRESENCE OF SUBMARINE BOATS.
APPLICATION FILED JUNE 27, 1917.
1,293,740.
Patented Feb. 11, 1919.
4 SHEETS—SHEET 3.
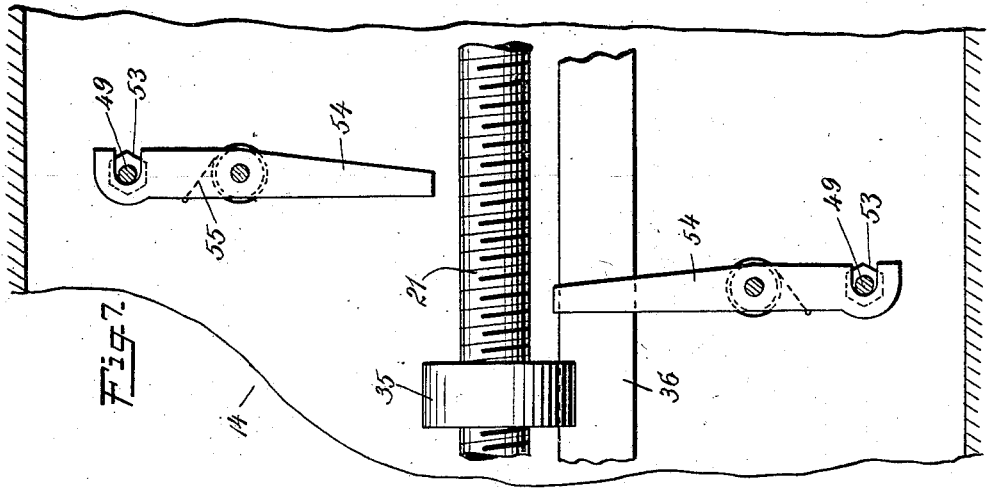
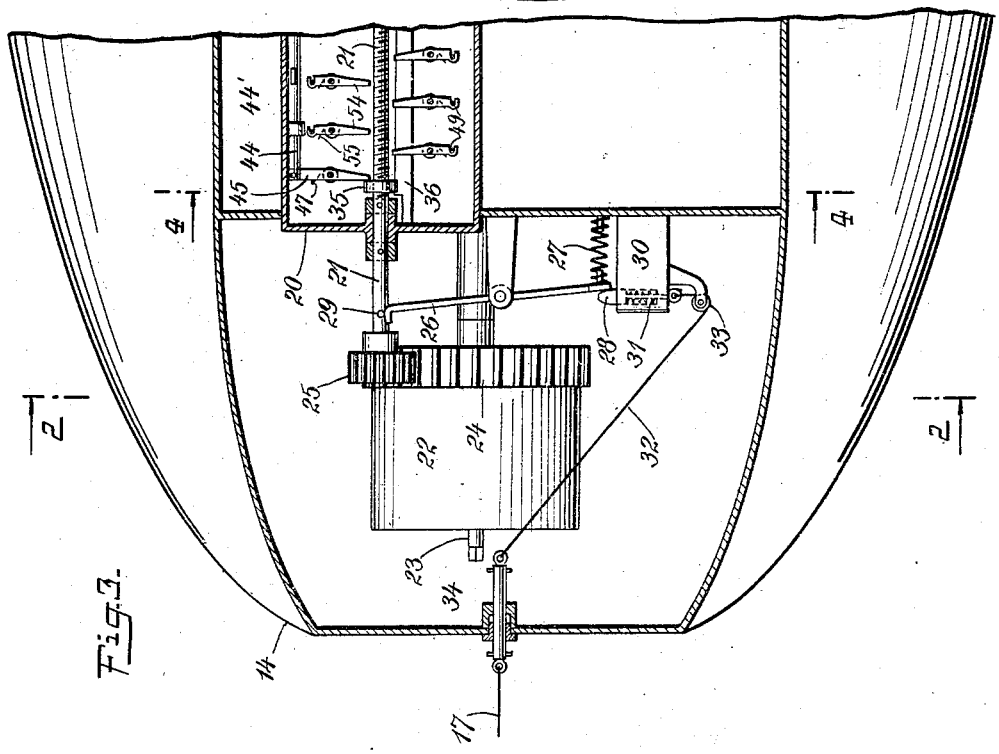

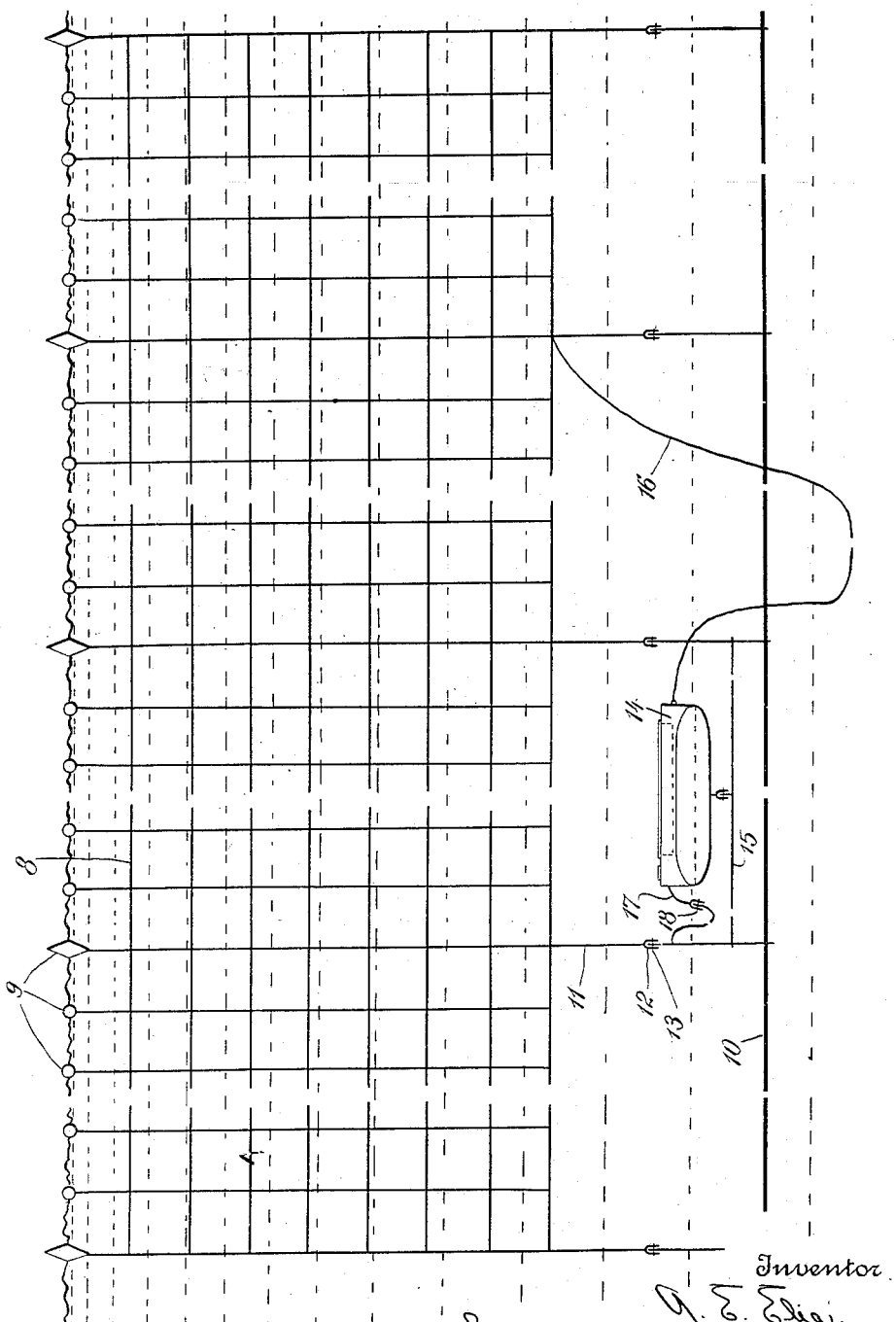

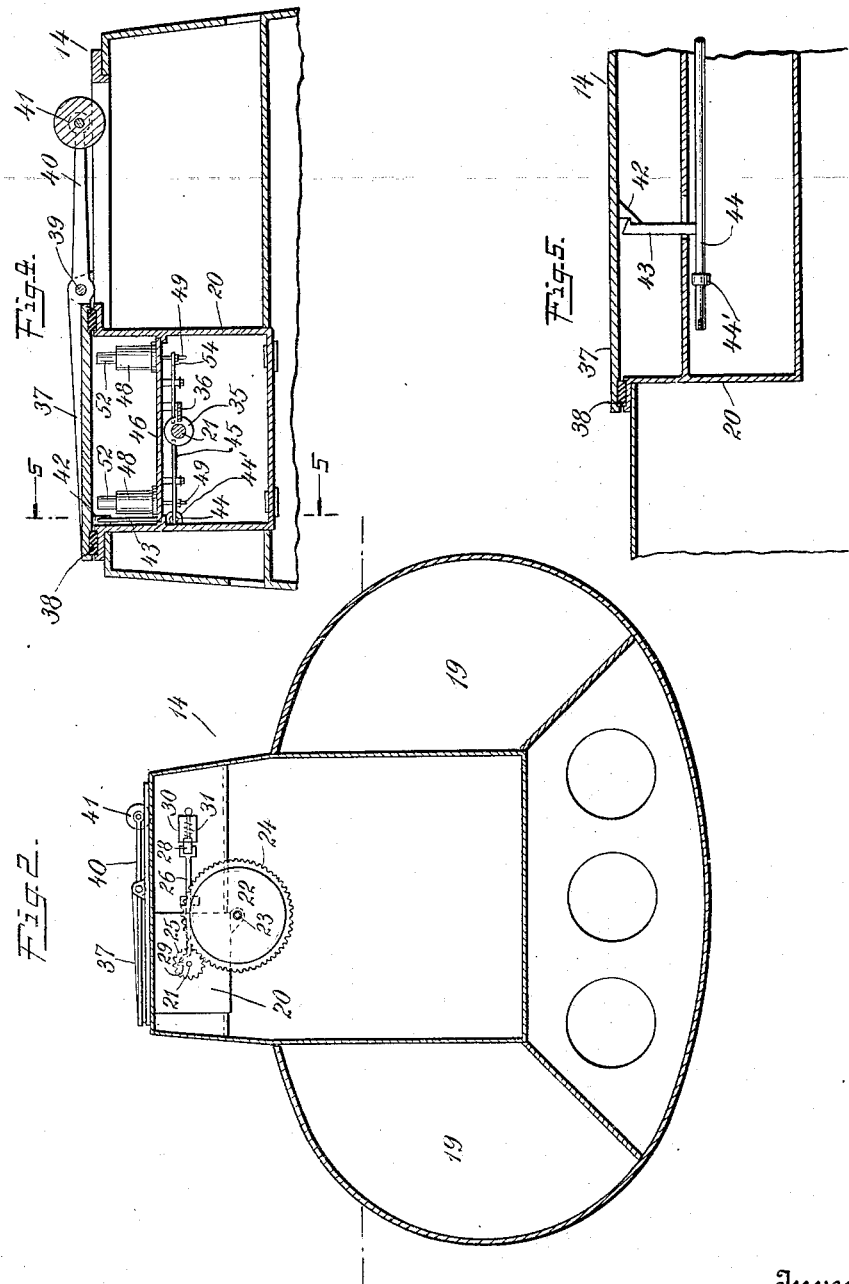

G. E. ELIA.
APPARATUS FOR DETECTING AND INDICATING THE PRESENCE OF SUBMARINE BOATS.
APPLICATION FILED JUNE 27, 1917.
1,293,740.
Patented Feb. 11, 1919.
4 SHEETS—SHEET 4.
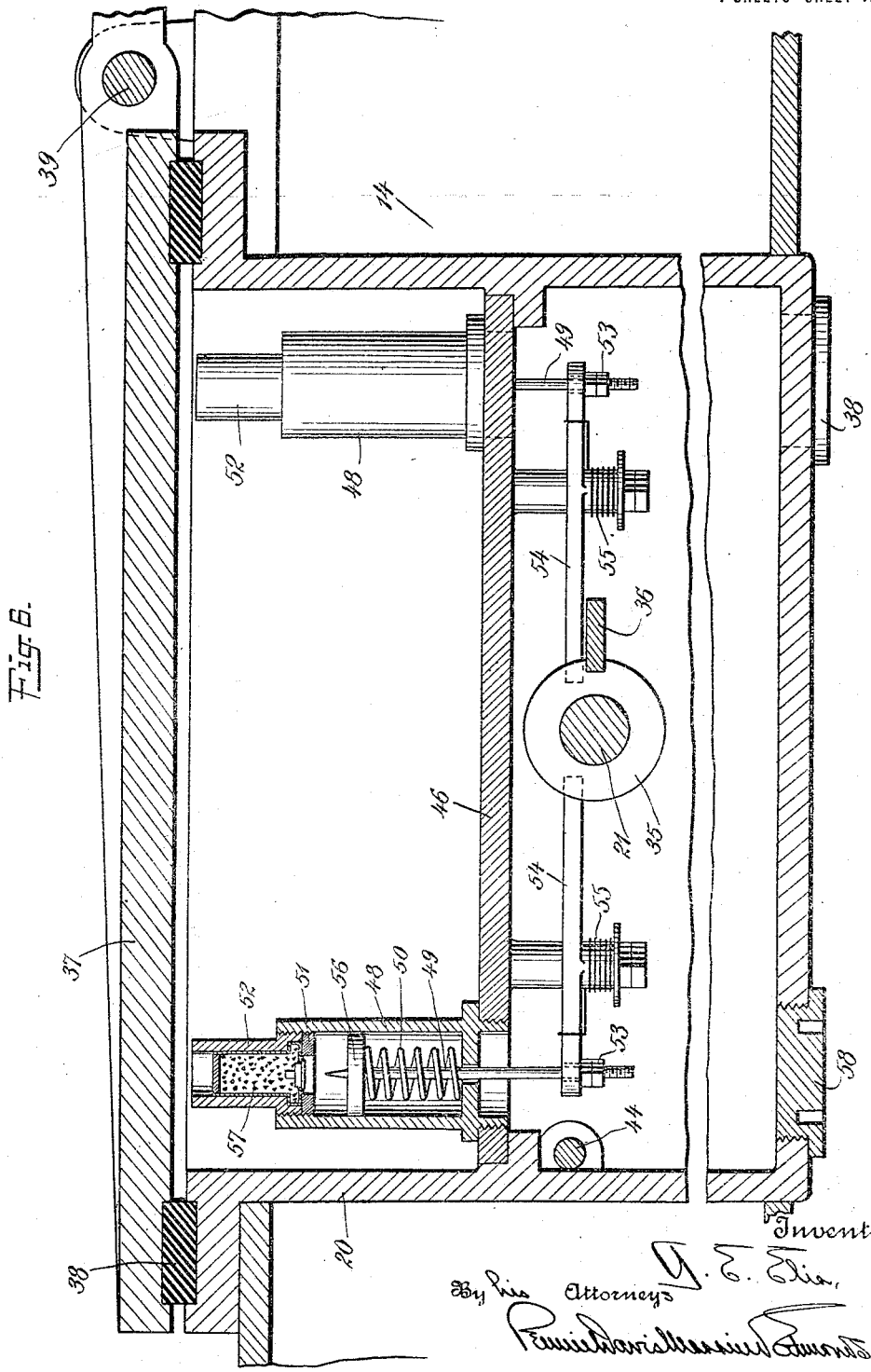

UNITED STATES PATENT OFFICE.

GIOVANNI EMANUELE ELIA, OF NEW YORK, N. Y.

APPARATUS FOR DETECTING AND INDICATING THE PRESENCE OF SUBMARINE BOATS.

1,293,740. Specification of Letters Patent. Patented Feb. 11, 1919.

Application filed June 27, 1917. Serial No. 177,313.

*To all whom it may concern:*

Be it known that I, GIOVANNI EMANUELE ELIA, a subject of the King of Italy, residing at New York city, in the county of New York, State of New York, have invented certain new and useful Improvements in Apparatus for Detecting and Indicating the Presence of Submarine Boats; and I do hereby declare the following to be a full, clear, and exact description of the invention, such as will enable others skilled in the art to which it appertains to make and use the same.

This invention relates to apparatus for detecting and indicating the presence of submarine boats. The invention involves the use of nets adapted to be placed in the sea as barriers to be engaged by hostile submarine boats and signaling devices arranged to be operated under predetermined conditions to convey information that a submarine boat has engaged a net and to indicate the location of the net which has been so engaged.

The invention involves the combination with such a net barrier of automatically operated visual signaling devices consisting of automatic mechanism for firing rockets or similar aerial signals at regular intervals over an extended period of time.

Various forms of aerial signaling devices may be employed in the practice of the invention and the mechanism for firing these signaling devices periodically over an extended period of time and under the control of the movement of the net barrier may be varied over a wide range, the distinguishing characteristic of the invention being the use of aerial signaling devices such as rockets which are fired automatically at regular intervals over an extended period of time immediately after the net barrier with which the signal mechanism is associated is engaged by a submarine boat and propelled through the water thereby. It is contemplated that the area guarded by the net barriers would be so patroled that the aerial signals given by the signaling device would be observed from a patrol boat which would at once proceed to the location of the net which had been carried from its position and undertake the destruction of the submerged submarine boat.

The aerial signals which I prefer to employ are rockets of any one of the types commonly used in signaling from surface ships at sea. Such rockets are now available in the form of cartridges of comparatively small size which may be fired by a simple form of trigger mechanism and the luminous balls thus discharged ascend to a height of as much as 1000 feet. Such signals are visible during daylight and at night over a large area. Furthermore, the signals may be of any desired color and therefore the signaling devices may be arranged to send signals of different colors in a prescribed order so as to indicate even more definitely the location of the apparatus sending the signals.

The invention will be more readily understood by reference to the accompanying drawings which illustrate one form in which the invention may be embodied. It will be understood, however, that the features of the invention are not limited with respect to the type of signaling rockets employed or to structural features of the mechanism used for firing the rockets. Any desired form of aerial signaling device may be employed and the mechanism for firing the rockets periodically over an extended period of time may be varied as desired without departing from the spirit of the invention, which, in its broader aspects, involves the provision of any form of net barrier adapted to be submerged in the sea in position to be engaged by a hostile submarine boat, a signaling device connected to this net barrier, mechanism in the signaling device for discharging visual signals periodically over an extended period of time and automatic means for starting this mechanism in operation when the submerged net has been engaged and propelled from its normal position by a submarine boat.

In the drawings, Figure 1 is a view of a net submerged in water and a signal mechanism connected thereto; Fig. 2 is a transverse section of the signal mechanism, the plane of the section being indicated by the line 2—2 on Fig. 3; Fig. 3 is a horizontal section through the upper portion of one end of the signal mechanism; Fig. 4 is a transverse section on the line 4—4 of Fig. 3; Fig. 5 is a detail sectional view on the line 5—5 of Fig. 4; Fig. 6 is a transverse section on an enlarged scale illustrating the construction of the firing mechanism; and Fig. 7 is a horizontal sectional detail view of certain of the parts of the firing mechanism.

Referring to these drawings, Fig. 1 shows a net 8 adapted to be submerged in the sea in a substantially vertical position. A multiplicity of buoys 9 are connected to the upper edge of the net so as to hold the net substantially vertical with its upper edge near the surface of the water. The lower edge of the net is connected at two or more points to a cable 10 by means of connecting cables 11. In comparatively shallow water the cable 10 would be allowed to rest upon the bottom but in deeper water the cable would be suspended by means of the connecting cables 11 and sustained in position thereby. It is contemplated that the net barrier as a whole would consist of a plurality of the net sections 8 and that each one of the several net sections would be connected individually to the series cable 10 which would extend the full length of the barrier and have its ends anchored or carried up to patrol boats. The independent connections of each net section 8 to the series cable 10 are arranged to permit detachment of the net section from the series cable when the net section is carried away by a submarine boat so that only the one section actually engaged is carried from its position in the barrier. In Fig. 1 each of the cables 11 by which the net section 8 is connected to the series cable 10 independent of the other net sections is shown as having a weakened portion 12 therein where breakage of the connection occurs when it is subjected to a predetermined strain. This weakened portion is provided in the form of a shearing pin 13 of soft metal.

The signal mechanism as a whole is indicated at 14 and it includes automatic mechanism for firing rockets periodically, which mechanism is started in operation when the net section 8 is carried away by a submarine boat. A motor-driven firing mechanism is provided in the signal mechanism 14 which is normally held against operation and the movement of the net section 8 through the water is caused to remove the lock or other arresting means which holds the firing mechanism against operation. Preferably, the signal mechanism as a whole is maintained normally submerged at a considerable depth so as to practically eliminate the danger of destruction of the signal mechanism by a hostile submarine boat, either accidentally or intentionally. Preferably the net section 8 extends to a considerable depth, such a depth that it would be engaged by a submarine boat cruising within the limits of submergence that are usual. The series cable 10 is suspended at a considerable distance below the lower edge of the net 8 so as to provide ample space for the signal mechanism between the series cable and the lower edge of the net. In Fig. 1 the signal mechanism 14 is shown as connected to the series cable 10 by a connection 15 having a shearing pin therein. In this instance the connection 15 is shown as made to the bottom of the boat-shaped signal mechanism 14 and as consisting of a cable extending between two of the independent connections 11 from the series cable 10 to the net section 8. The boat-shaped signal mechanism 14 is also connected by a cable 16 to the net 8. Another cable 17 connects the signal mechanism 14 to one of the cables 11 at a point therein below the shearing pin 13 and this cable connection 17 has a shearing pin 18 therein. The several shearing pins to which reference has been made are graduated as to strength so that when the net 8 is carried away by a submarine boat the shearing pins 13 in the connections 11 from the net to the series cable 10 will be the first to give way. The breakage of the connections 11 at these shearing pins allows the net 8 to be carried away without disarranging the other portions of the net barrier. Thereafter when the slack in the cable 16 is taken up by the movement of the net through the water, the signal mechanism 14 is subjected to strain which is transmitted to the connection 15 and which eventually causes the shearing pin in the connection 15 to give way. Thereafter, the cable connection 17 will be drawn taut and this cable is employed for releasing the locking mechanism which holds the actuating mechanism for the signal transmitter inoperative. After this lock has been withdrawn so that the signal mechanism is free to operate, the further movement of the net 8 through the water increases the strain on the cable connection 17 and finally the shearing pin 18 gives way, resulting in the complete disconnection of the signal mechanism 14 from the series cable 10. This buoyant signal mechanism then rises to the surface, it being permitted to do so by reason of the slack in the cable 16.

Referring now to Figs. 2 to 7 inclusive, a construction which may be employed in the signal mechanism will now be described. The casing of the signal mechanism may be in the form of a boat and it includes one or more air-tight chambers such as those shown at 19 in Fig. 2 to afford the necessary buoyancy. A box 20 is set into the upper portion of this casing and the firing mechanism for the rockets is contained within this box. A threaded shaft 21 extends entirely through the box 20 in the direction of the length of the casing and a motor is provided for rotating this shaft. Any suitable form of motor may be provided for this purpose. In the present instance, I have indicated a spring motor at 22 in Fig. 3. This motor is of substantial size and should be capable of driving the threaded shaft 21 over an extended period of time, preferably at least two hours. The motor 22 is shown as provided with a winding shaft 23 and as driving a gear 24. This gear meshes with a pinion 25 secured to the end of the shaft 21. Normally, the motor 22 is held inoperative and the shaft 21 at rest by a lever 26 pivotally mounted, as shown, on a transverse wall of the casing of the signal mechanism. This lever 26 is normally held in the position in which it is shown in Fig. 3 by a stop pin 28 which coacts with one end of the lever. When the lever is in this position its opposite end, which is bent laterally, lies in the path of movement of a pin 29 upon the shaft 21, thus precluding rotational movement of the shaft. When the pin 28 is withdrawn, the spring 27 turns lever 26 on its pivot so as to carry the end of the lever out of the path of movement of pin 29 and this frees the motor 22 so that it may operate to drive the shaft 21. The pin 28 is mounted in a passage through a block 30 secured to the structure of the signal mechanism and is normally pressed out to the position in which it is shown in Fig. 3 by a spring 31. The end of the pin or plunger 28 opposite that which coacts with the lever 26 has one end of a cable 32 attached thereto. This cable passes over a sheave 33 and its other end is connected to a rod 34 which passes through a stuffing box in an opening in the casing of the signal mechanism. The outer end of this rod has the cable 17 connected thereto. Thus, when the cable 17 is drawn taut, it acts through the rod 34 and cable 32 to withdraw the pin 28 with the result that the motor 22 is released for operation.

The shaft 21 is mounted for rotation in bearings formed in the ends of the box 20 and throughout the whole length of the box the shaft 21 is threaded. On the shaft is a traveler 35 in the form of a nut interiorly threaded to coact with the threads on shaft 21 and held against rotation with the shaft by a strip 36 mounted within the box and having one edge thereof extending into a slot in the peripheral surface of the traveler 35. Thus, as shaft 21 is rotated by motor 22, the traveler 35 is caused to move from its initial position in which it is shown in Fig. 3 along the shaft 21 in the direction of the length of the box 20.

While the signal mechanism is submerged, the box 20 is closed watertight, but just prior to the firing of the signal rockets, the cover of the box is withdrawn. In the present instance the box is shown as provided with a hinged cover 37 and gaskets 38 are provided between the under side of this cover and flanges at the top of the box 20 to prevent the entrance of water into the box while the signal mechanism is submerged. The cover 37 is hinged to the box as shown at 39 and at each end of the cover is an extension 40 to the opposite side of the hinge. These two extensions carry a weight 41 whereby when the cover 37 is released, it is turned on its hinge to an open upright position and held firmly in that position. Normally the cover is locked in the closed position by a plurality of locking devices which may be of the form shown in Fig. 5. In this figure the cover 37 of the box is shown as provided with a plurality of hooked members 42. Each of these members is engaged by a coacting hooked member 43 mounted upon a rod 44 extending lengthwise of the box 20 and adapted to be moved in the direction of its length in brackets 44'. This rod 44 is connected at one end by a pin and slot connection to a pivoted lever 45 mounted on the under side of a shelf 46 within the box 20. The lever 45 has a spring coiled about its pivot and acting on the lever in the direction to hold the coacting hooked members 42 and 43 in engagement to lock the cover 37 in the closed position. The inner end of the lever 45 extends into the path of movement of the traveler 35. Thus, when the motor 22 starts in operation and the traveler progresses along the threaded shaft 21, the traveler engages lever 45 and turns it on its pivot against the tension of its spring 47, resulting in longitudinal movement of the rod 44 and the locking members 43 thereon until the hooks on the end of these members 43 are released from the locking members 42. Thereupon, the cover 37 is unlocked and it is at once swung from the closed to the open position by the weight 41.

On the plate 46 within the box 20 are a multiplicity of receptacles for rocket cartridges and a firing mechanism for a cartridge associated with each receptacle. These receptacles for cartridges and their firing mechanisms are arranged in two parallel lines extending along the lateral edges of the plate 46 and parallel with the shaft 21. Any number of cartridges and firing mechanisms desired may be employed, as, for instance, two rows of sixty cartridges in each row and the firing mechanism may be arranged to effect the firing of the cartridges in the several receptacles at regular intervals of say one minute, under which conditions the signaling mechanism would continue in operation sending out signals periodically for two hours. The plate 46 is provided with a row of threaded openings along each of its lateral edges and each of these threaded openings receives a cylindrical member 48 in which is a spring-actuated firing pin 49 moved upwardly by a coiled spring 50. The upper end of the cylindrical member 48 receives a threaded annulus 51 and also the lower end of a tubular cartridge holder 52. The firing pin 49 is extended downwardly below plate 46 and its lower end is threaded to receive nuts 53. A lever 54 is pivoted upon the under side of plate 46 in association with each one of the several cartridge holders and firing mechanisms. The lever 54 is provided with a slot at its end open to one side of the lever and the lever is normally held in a position in which the firing pin 49 lies within this slot. The lever is held in this position by a spring 55 coiled about the pivot of the lever, as is indicated in Figs. 6 and 7. In this position the nuts 53 on the firing pin hold the pin against upward movement caused by the spring 50 and the spring is under tension between a disk 56 on the firing pin and the wall at the lower end of the cylindrical member 48. The end of each lever 54 distant from the firing pin 49 extends into the path of movement of the traveler 35, as shown in Figs. 6 and 7. The several cartridge holders of the two rows on plate 46 are arranged in staggered relation, as is indicated in Figs. 3 and 7, so that the traveler 35 will engage a lever 54 on one side and then the other alternately.

The operation of the mechanism above described has been indicated in connection with the description of the construction. In preparing the apparatus for operation, each of the tubes 52 constituting the cartridge holders is removed by unscrewing it from the cylindrical member 48, a cartridge 57 is placed therein, and the tube is then restored to its normal position. Also, all of the firing pins 49 are depressed to the position indicated in Fig. 6, placing the springs 50 under tension, and each firing pin is locked in this position by moving the associated lever 54 to the position in which its end lies above the nuts 53 on the lower end of the firing pin. The traveler 35 must, of course, be at the end of its range of movement as shown in Fig. 3 when this is done. These preparations may be made before placing the plate 46 within the box 20. If so, the plate is then mounted in position within the box and the cover of the box is then moved to the closed position and locked therein by means of the coacting locking members 42 and 43. If desired, the bottom of the box 20 may be provided with removable watertight caps 58 which may be removed to permit access to the interior of the casing for manipulating the parts of the locking mechanism.

When the net section is carried away by a submarine, it is detached from the series cable 10; then the signal mechanism is detached from the series cable 10; then the stop 28 is withdrawn by the cable 17 from the position for arresting operation of the spring motor and then the connection 17 is broken at the shearing pin therein. After these things have occurred, the signal mechanism rises to the surface by reason of its buoyancy. Shortly after the signal mechanism reaches the surface, the cover of the box is opened. But a limited period of operation of the spring motor 22 is necessary to effect this and this period is made only long enough to insure that the signal mechanism will reach the surface before the cover is opened. After this period, the traveler 35 engages the pivoted lever 45 and operates it to release the lock for the cover 37 which is thereupon turned by its weight to the open position. From that time on the rotation of the shaft 21 causes the traveler 35 to progress steadily in the direction of the length of box 20 and at regular intervals the traveler engages and turns one of the levers 54. Each lever when so turned releases the coacting firing pin 49, which when released, is moved upward by its spring 50 so as to deliver a hammer blow upon the primer of the rocket cartridge 57. Thus, the signal rockets are fired at regular intervals of time throughout the period of movement of the traveler 35 along the threaded shaft 21. The rate of movement of the traveler 35 and the distance between successive levers 54 determines the interval between successive rockets and the duration of the total time of sending out the signals may be extended as desired by extending the length of the box 20 and consequently the number of rockets and firing mechanisms therein. Furthermore, as stated above, the rockets may be of different colors and those of different colors may be fired in a prescribed order, the succession of the colors being employed for conveying additional information.

I claim:

1. Apparatus for detecting and indicating the presence of submarine boats comprising the combination of a net adapted to be submerged in the sea, a signal mechanism for displaying visual signals periodically, operating mechanism for the signal mechanism, and a connection from the net to the operating mechanism for causing the latter to operate to display the signals when the net is moved through the water; substantially as described.

2. Apparatus for detecting and indicating the presence of submarine boats comprising the combination of a net adapted to be submerged in the sea, a signal mechanism for displaying visual signals periodically, operating mechanism for the signal mechanism, a motor for driving the operating mechanism, a stop for arresting the motor, and a connection from the net to the stop whereby the motor is released and drives the operating mechanism when the net is moved through the water; substantially as described.

3. Apparatus for detecting and indicating the presence of submarine boats comprising the combination of a net adapted to be submerged in the sea, mechanism for firing rockets periodically, and a connection from the net to said mechanism for causing the mechanism to be actuated to fire rockets periodically when the net is moved through the water; substantially as described.

4. Apparatus for detecting and indicating the presence of submarine boats comprising the combination of a net adapted to be submerged in the sea, mechanism for firing rockets periodically, a motor for driving the same, a stop for the motor, and a connection from the net to the stop for releasing the motor and actuating said mechanism when the net is moved through the water; substantially as described.

5. Apparatus for detecting and indicating the presence of submarine boats comprising the combination of a net adapted to be submerged in the sea, a signal mechanism for displaying visual signals periodically, means for holding the signal mechanism normally in a submerged condition, means for causing the signal mechanism to rise to the surface when the net is propelled through the water, and operating devices within the signal mechanism actuated automatically when the net is moved through the water for displaying visual signals periodically; substantially as described.

6. Apparatus for detecting and indicating the presence of submarine boats comprising the combination of a net adapted to be submerged in the sea, mechanism for firing rockets periodically, means for holding said mechanism normally submerged, means for causing said mechanism to rise to the surface and to operate to fire rockets periodically when the net is moved through the water; substantially as described.

7. Apparatus for detecting and indicating the presence of submarine boats comprising the combination of a net adapted to be submerged in the sea, a signal mechanism for displaying visual signals periodically, a cover for said mechanism, a connection from the net to the signal mechanism, and means operated by movement of the net through the water for removing the cover of said mechanism and causing the mechanism to operate to display visual signals periodically; substantially as described.

8. Apparatus for detecting and indicating the presence of submarine boats comprising the combination of a net adapted to be submerged in the sea, a buoyant signal mechanism for displaying visual signals periodically, means for holding the signal mechanism submerged, a connection from the net to the signal mechanism, and means operated by movement of the net through the water to release the buoyant signal mechanism and cause it to operate; substantially as described.

9. Apparatus for detecting and indicating the presence of submarine boats comprising the combination of a net adapted to be submerged in the sea, a buoyant signal mechanism for displaying visual signals periodically, means for holding the signal mechanism submerged, a cover for the signal mechanism, a connection from the net to the signal mechanism and means operated by movement of the net for releasing the buoyant signal mechanism, effecting the removal of the cover and causing the signal mechanism to operate; substantially as described.

10. Apparatus for detecting and indicating the presence of submarine boats comprising the combination of a net adapted to be submerged in the sea, a signal mechanism including a receptacle having a cover, a lock for the cover, a motro-driven firing gear within the receptacle, and a connection from the net to the signal mechanism through which movement of the net through the water operates to release said lock and cause operation of the firing gear; substantially as described.

11. Apparatus for detecting and indicating the presence of submarine boats comprising the combination of a net adapted to be submerged in the sea, a signal mechanism including a receptacle having a cover, a lock for the cover, a firing gear within the receptacle, a motor for first operating the lock to release the cover and then operating the firing gear, and a connection from the net to the signal mechanism through which movement of the net through the water causes operation of the motor; substantially as described.

In testimony whereof I affix my signature.

GIOVANNI EMANUELE ELIA.

Copies of this patent may be obtained for five cents each, by addressing the "Commissioner of Patents, Washington, D. C."